Patented Aug. 4, 1931

1,816,998

UNITED STATES PATENT OFFICE

EVERETT B. CUSHMAN, OF HOLLYWOOD, CALIFORNIA, ASSIGNOR OF ONE-HALF TO FOOD MACHINERY CORPORATION, OF SAN JOSE, CALIFORNIA, A CORPORATION OF DELAWARE

METHOD OF CURING ALFALFA HAY AND OTHER VEGETATIVE PRODUCTS

No Drawing. Application filed October 21, 1927. Serial No. 227,866.

This invention relates to a method of curing alfalfa hay, and has to do particularly with a novel and comparatively simple method for quickly drying the alfalfa and at the same time maintaining or renewing its original green color.

Heretofore in the curing of alfalfa hay it has been the practice to dry or cure the alfalfa by cutting with a grass mower and allowing the alfalfa to lay for a day or two to dry. This alfalfa is then raked into windrows or piles, allowed to still further dry for from some four to six days. If no dew or rain touches the alfalfa during this drying out period, most of the plant will dry or cure to a desired green color. However, in most parts of the United States there is usually enough dew or rain in combination with the sun which will cause bleaching of the alfalfa during the drying period. This bleaching may not materially affect the food value for the stock, yet it does materially affect its market value and renders the alfalfa almost useless for rabbit feed, etc.

It is the object of the present invention to provide a method for quickly drying the alfalfa, immediately after cutting to eliminate all possibility of bleaching due to rain and sun, and also to preserve or restore the deep fresh green color of the alfalfa. I preferably carry out this novel method to obtain the novel result by first cutting the alfalfa in the usual way and while it is still fresh and green. This fresh, green alfalfa is then passed through suitable rollers, or some form of a crusher adapted to break down the cells containing the juice or sap. This crushing may be accomplished by merely passing the green fresh alfalfa between suitable resilient or fixed rollers, and it will be obvious that any form of apparatus may be used which will roll or crush the alfalfa to an extent sufficient to break down the cells of the plant and liberate the juice or sap.

The juice of the alfalfa is of a bright green color, substantially the same as the plant, and as the plant is crushed the juice from the more tender portions of the plant acts as a dye to any other parts of the plants that should not be of the same bright green color, particularly the stems, and this juice thus restores the entire plant back to its original color as when cut, or as when young. This crushing of the stems and the saturation of the same with the juice from the tender portion of the plants also tends to make the stems more tender.

This novel step of crushing the alfalfa immediately after cutting, and preferably while fresh and green, also has another desired result in that it greatly accelerates the drying of the alfalfa. As the plants are crushed the juice or sap of the plant, instead of being sealed up in the cells of the plant, is forced to the outside of the plant and exposed to the air. This allows the plant to dry in a much shorter time, and it has been found that alfalfa crushed according to my method has dried in from twelve to eighteen hours, showing no signs of bleaching regardless of the weather encountered during this short drying out. A further direct advantage of this crushing and quick drying is that the alfalfa cured in this manner seems to retain its fragrance much better than alfalfa cured as has been the common practice. Another beneficial result of this new method is that the leaves of the alfalfa do not shatter off as badly.

It will thus be seen that I have provided a novel, quick and very inexpensive method for accelerating curing of alfalfa hay, and which method, due to the inherent step of crushing the alfalfa, not only accelerates the drying to prevent bleaching, but also effects dyeing of the older or lighter parts of the plant whereby the entire crushed plant is given a bright green color which simulates exactly the fresh green color of the alfalfa before it is cut.

It is believed that this accelerating of the curing or drying of the alfalfa not only prevents bleaching but also retains a greater percentage of food value in the plants than when the plant is subjected to a long drying period.

It will be obvious that the degree of crushing applied to the alfalfa plants can be varied considerably according to the quality and condition of the plant at the time of cutting, as will be understood by those skilled in the art. It will also be obvious that the drying out or curing of the alfalfa hay after being crushed according to my process may vary considerably, according to the climatic conditions and quality of the plant, and it will be understood that such alfalfa hay, cured according to my method, may dry in less than the twelve hours or in more time than eighteen hours and still dry much quicker and with better results than the present method of drying alfalfa, which takes from four to six days.

What I claim is:

1. The method of curing alfalfa and the like, which comprises cutting the plant when fresh and green, crushing the plant to release liquid contained in the cells thereof and then allowing the crushed plants to dry, the crushing and releasing of liquid serving to accelerate drying of the plant.

2. The method of accelerating the drying of alfalfa hay and the like to prevent bleaching, which comprises cutting the alfalfa while still green and forcing a portion of the liquid from the cells of the plant to the outside of the plant whereby it may quickly evaporate.

3. The method of curing alfalfa hay or the like, which comprises crushing the alfalfa whereby to remove some of the plant liquid to dye other parts of the plant, and then allowing the crushed plants to dry, the liquid crushed from the plants serving to accelerate the drying thereof.

4. The method of curing alfalfa and the like, which comprises cutting the plant when fresh and green, crushing the plant to release liquid contained in the cells thereof, and then drying the crushed plant.

5. The method of curing alfalfa hay and the like, which comprises the step of crushing fresh plants before curing, whereby liquid from the cells of part of the plant is liberated and other parts dyed thereby.

6. The method of curing alfalfa and the like, which comprises crushing the plant before drying to release liquid from the cells of the plant, whereby drying is accelerated.

In testimony whereof I affix my signature.

EVERETT B. CUSHMAN.

CERTIFICATE OF CORRECTION.

Patent No. 1,816,998.                          Granted August 4, 1931, to

EVERETT B. CUSHMAN.

It is hereby certified that the above numbered patent was erroneously issued to the inventor, said "Cushman, and one-half to Food Machinery Corporation, of St. Jose, California, a corporation of Delaware", whereas said patent should have been issued to Food Machinery Corporation, of St. Jose, California, a corporation of Delaware, said corporation being assignee by mesne assignments, of the entire interest in said invention, as shown by the records of assignments in this office; and that the said Letters Patent should be read with this correction therein that the same may conform to the record of the case in the Patent Office.

Signed and sealed this 3rd day of November, A. D. 1931.

(Seal)

M. J. Moore,
Acting Commissioner of Patents.